Patented Jan. 3, 1939

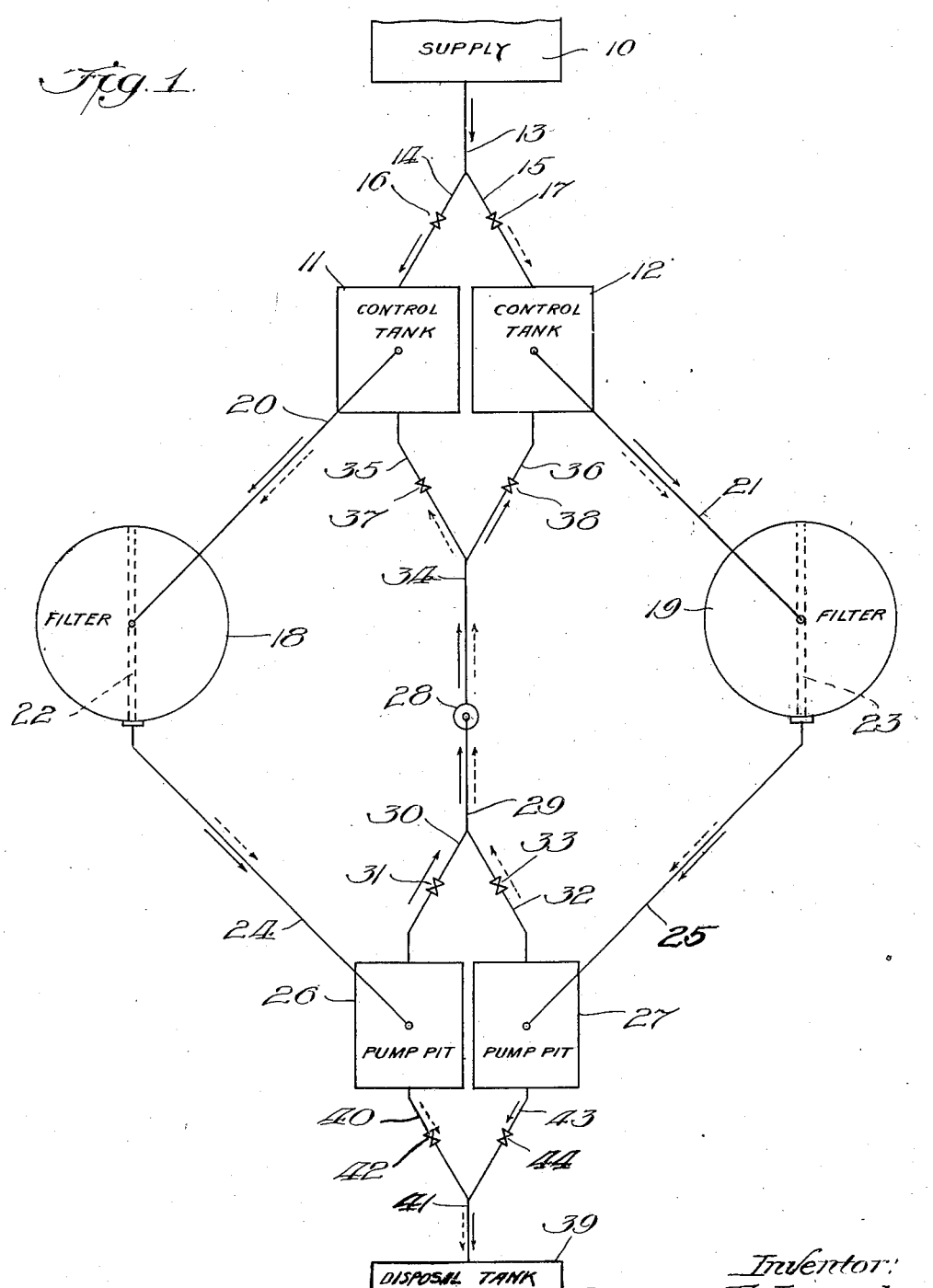

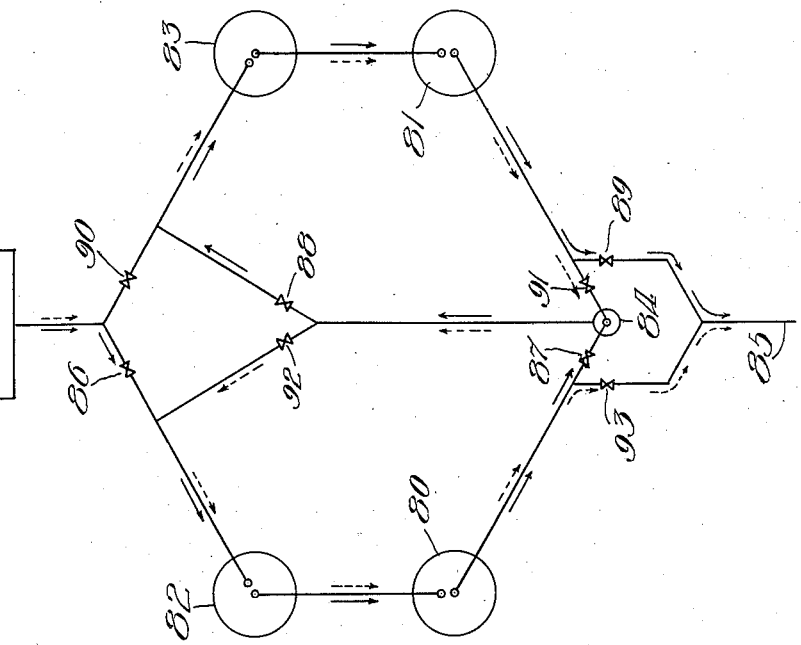
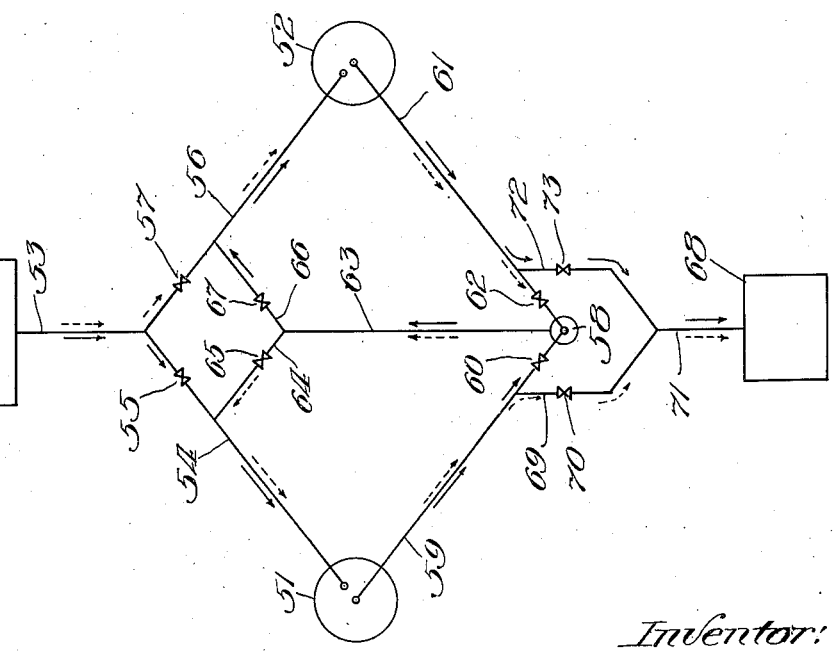

2,142,196

UNITED STATES PATENT OFFICE 2,142,196

SYSTEM FOR AND METHOD OF TREATING SEWAGE OR OTHER WASTE MATERIAL

Lawrence E. Langdon, Wilmette, Ill., assignor to Pacific Flush Tank Company, Chicago, Ill., a corporation of Illinois Application March 17, 1937, Serial No. 131,439

6 Claims. (Cl. 210—7)

My invention relates generally to the treatment of sewage or other waste material, and it has to do particularly with a system for and method of treating sewage or other waste material by passing it through a trickling filter system.

It has been customary heretofore to employ trickling filters for secondary treatment of sewage or other waste material; however, in such treatment, it has been customary to pass the material onto a single-stage filter and thence to a setting tank. A treatment of the foregoing character involves numerous objectionable conditions which are overcome by my invention; and, in order that my invention may be better understood, I will refer briefly to the structure, mode of operation and disadvantages involved in such prior treatment.

A trickling filter generally consists of a bed of coarse material, such as gravel or crushed rock, and some means for applying the sewage or other material uniformly over the entire surface of the filter bed. This latter means may take the form of the usual stationary spray devices or various known kinds of rotary or traveling distributor devices. The filter further includes some arrangement by which the applied material is collected at the bottom of the filter for disposal or further treatment. It is to be understood that the term "sewage" wherever used herein is intended to include ordinary sewage material or other waste materials which require filtering treatment similar to ordinary sewage material.

In the use of a structure of the foregoing character, as the sewage is applied to the filter bed, a gelatinous film forms upon the surface of the filter media and this film is of a character which supports a comparatively heavy growth of active bacterial and plant life. This bacterial and plant life acts upon the sewage, as the latter passes through the filter bed, in such a manner as to change the form of the dissolved solids and a certain portion of the suspended solids from an objectionable organic material into a more suitable form, wherein the effluent from the filter is stable, and is substantially free from any polluting influence so that it is in proper condition for final disposal. As will be well understood by those skilled in the art, the action which takes places in the filter bed is both biological and mechanical, the mechanical function lying in the ability of the filter bed to separate out a part of the suspended matter from the sewage, and the biological function lying in the ability to separate out a part of the suspended matter from the sewage, and the biological function lying in the ability to separate out dissolved materials and also to change the physical state of the dissolved and suspended materials to produce the condition above stated. Another intended function of such a filter should be, biologically speaking, to convert the solid material in the effluent from the filter into such form that it will more readily and more rapidly settle out in the final settling action; however, difficulty has been experienced in this regard due, in part at least, I believe, to the deficiencies in such prior-used filters as I will point out more particularly hereinafter.

The efficiency of the mechanical operation of the filter is determined by the quantity of suspended solids retained in the filter, and the biological efficiency of the filter is determined by the quantity of B. O. D. (5-day biochemical oxygen demand—generally used as a measure of the load on the filter) which is removed by the filter. Under the customary or prior modes of operation, the usual flow to an ordinary filter arrangement, such as above described, is approximately two million gallons per acre per day of the sewage material, the same having an applied strength of approximately 130 parts per million (p. p. m.) of B. O. D., or a normal loading of 250 pounds of B. O. D. per acre-foot per day. This low capacity of the prior filter arrangement, as compared with that provided for by my invention, is due to various conditions which necessarily limit the ability of the filter to do greater work within the day unit of time and still operate with the intended economy and efficiency desired in arrangements of this character. More particularly, it is desirable that any particular filter arrangement be operated continuously over comparatively long periods of time, regardless of varying weather conditions. In the use of prior filter systems, it has been found that the desired continuity of operation, as well as intended efficiency, is impaired in the event that the filter is overloaded, or even if it closely approaches an overloaded condition, and practice has shown that the foregoing capacity ratings must be substantially adhered to in order to obtain the desired operation. The rates of loading of the filters must not exceed the ability of the filter to carry out its biological function, otherwise the intended result is lost. The load which a normal trickling filter can successfully handle, operating continuously, is considerably less than that which it can handle for a short period of time. Consequently, by operating in the accepted manner, the filter must be loaded at rates at which one may expect to get the efficient removal continuously. This means that one must employ, with such prior arrangements, considerably more filter area in order to increase filtering capacity, rather than to step up the handling capacity of the filter.

Also, in the use of prior filtering systems, physical plugging results from overloading, causing objectionable pooling conditions and making it necessary to put the filter out of service or to dose it heavily with a chemical in order to bring it back to normal operating condition. This results in a decrease in the overall efficiency of operation of the entire plant, and, to avoid shutdown of the plant, it requires the use of additional expensive equipment, which is highly objectionable from the economy standpoint. If an attempt is made to step up the capacity of the ordinary filter, continued operation would require the alternate operation of several filters, each of which would be in operation only periodically while the others are resting, so-to-speak, and this would involve considerable additional construction cost, as well as additional waste of space. All of these conditions, just explained, materially limit the capacity of prior trickle filter systems.

Another objectionable condition that exists in prior filter systems is that periodical unloadings occur. When this takes place, very heavy discharges of material are sloughed from the filter to the ultimate disposal, causing considerable nuisance. In present arrangements, this period of unloading generally occurs at least twice a year, and at periods of unloading the efficiency of the entire treatment is considerably reduced and quite heavy and objectionable pollution is discharged to the point of disposal. In addition to the inconvenience attendant upon such a condition at the point of disposal, the efficiency of the filter itself is materially reduced and must be restored.

An additional nuisance existent in the operation of prior filters lies in the fact that, at certain periods of the year, the filter is infested with Psychoda, or filter flies, in such numbers as to make it very unpleasant for anyone in the vicinity of the filter bed. It appears that these flies form in great quantities due to the fact that in the use of the ordinary filter system, the filter bed is not continuously dosed or kept sufficiently wet at all times to destroy the larvae of these flies in the filter bed. It has been found that these flies may be destroyed by allowing the filter to become completely flooded, thereby destroying the larvae, but, in order to do that, in prior filter systems, it is necessary to put the filter out of service for two or three days with the attendant disadvantages above discussed.

One of the objects of my invention is to provide an improved system and method for treating sewage or other waste material by passing it through a trickle filter system, and wherein the foregoing objectionable conditions existent in the use of prior filter systems are eliminated.

Another object is to provide a filter treatment for sewage material in which higher rates of loading may be employed, and the efficiency in the removal of both B. O. D. and suspended solids is increased. In carrying out this feature of my invention the material may be fed continuously at a high, maximum or near-maximum, rate of loading without loss of efficiency in the removal of B. O. D. and suspended solids and without clogging, ponding or other objectionable conditions.

Still another object is to provide a sewage treatment of the foregoing character wherein the sewage handling capacity is increased without increase in size of filtering equipment, thereby materially reducing capital cost for any given installation by reducing both construction and operating costs, as well as conserving space. That is to say, with my invention, one may use a certain size filter bed and secure an increased handling capacity or, by reducing the size of the filter bed, one may secure the same handling capacity as a considerably larger bed.

A further object is to provide a filter system having so-called primary and secondary filter beds arranged in series and adapted for reversal of the flow sequence to such filter beds, under predetermined conditions of operation, so that the original primary bed then operates as the secondary bed and the original secondary bed operates as the primary bed.

Another object is to provide a sewage treatment system embodying at least two filtering structures operating in series in such a way that the primary filter is fed at a maximum or near-maximum capacity and performs its maximum functions biologically and mechanically, the arrangement being such that the secondary filter is simultaneously conditioned to act as a primary filter when it is desired to reverse the flow and give the original primary filter a rest by causing it to operate under secondary filter conditions, which operations are carried out continuously with the increased efficiency results above mentioned.

Additional objects are to provide a sewage treatment system providing for increased efficiency of removal of B. O. D. and suspended solids by providing filter beds properly seeded so as to be more effective in the performance of the bacteriological function; to provide a sewage treatment system including a further operation wherein difficulties due to ponding are avoided and eliminated by reversal of the filtration process; to provide an arrangement of the foregoing character wherein the fly nuisance is eliminated; to provide a system of the foregoing character wherein the solid material of the effluent is reduced to such a highly flocculent character that it will readily settle out in a clarifying, settling, or like tank; to provide a sewage treatment of such nature that the effluent finally discharged is of such character that the solid materials therein have been uniformly stabilized by bacteriological action and is substantially free from materials which will cause pollution so that it is in condition for permissible final discharge; and to provide a sewage treatment including filtering wherein the filtering structure is operated at or near its maximum loading capacity without objectionable periodical unloadings or sloughing off.

In practicing my invention, I employ at least two filter beds or zones which are connected in series in such a way that the sewage material is fed first to one bed and then to the other in a continuous manner. At any particular stage in the operation of my invention, the filter bed which is first dosed with the sewage material is termed the primary and the other the secondary filter bed.

The sewage is first dosed, preferably in a controlled manner, to the primary filter, and after it has passed through that filter it is delivered, by pumping or other control means, to the secondary filter and it will be discharged from that filter, either before or after settling, to the final disposal. This particular cycle of operation is continued, according to my invention, so long as the primary filter continues to operate with the desired efficiency, as determined, preferably but not necessarily, by the percentage of removal of the B. O. D. in the primary filter. In other words, this cycle is continued until the primary filter approaches the point of overloading, as determined, for example, by the percentage of reduction of B. O. D. When this condition is approached or occurs, the controlled flow of sewage material is reversed so that the new, unfiltered material is dosed first to the former secondary filter from which it is caused to flow by pumping or other means to the other, or original primary, filter which then operates as the secondary filter.

In carrying out the foregoing, it will be appreciated that the organisms of the primary filter are capable, at the maximum or near-maximum loading, of being fed to the limit of their feeding capacity, and they are capable of handling this feeding with the intended efficiency in percentage of B. O. D. removal for a certain time, dependent upon the character of the sewage material, when they will become overfed, so-to-speak. So long as the organisms of the primary filter are handling the material fed to them with intended efficiency, the organic material fed to the secondary filter is of such character that the organisms in that filter are rested or starved, so to speak; that is, they are being fed less than their normal feeding capacity. In carrying out my invention, when the organisms of the primary filter reach or approach an overfed condition and cannot bacteriologically handle all of the organic material being passed therethrough, as indicated, preferably but not necessarily, by a drop in percentage of B. O. D. reduction, the flow of the sewage material is reversed so that the raw or unfiltered sewage material is dosed directly to the original secondary filter and its so-called starved organisms, which then do the major part of the work. Upon such reversal, the material fed from the original secondary (which is now performing a primary function) to the original primary filter bed is of such nature, due to the feeding capacity of the organisms in the then-primary filter bed that the organisms of the previous primary or then-secondary are underfed and they are rested or are permitted to catch up, so as to speak, with their feeding work so that they eventually become under fed and starved. The cycle of operation is such that when this happens, the flow is again reversed, since the organisms in the filter bed then acting as the primary are approaching or have reached the point of overfeeding. This cycle, including reversal, is continued from time to time without cessation in the dosing of the filter beds and, in this way, the system may be fed or dosed with the sewage material to the maximum or near-maximum capacity of the filter bed without shutdown of either filter bed and with a continued high operating efficiency.

In certain instances, the effluent from the acting primary filter zone may be subjected to a settling action before it is delivered to the acting secondary filter zone. This will greatly reduce the load upon the acting secondary filter, thereby permitting additional resting of the secondary filter and more rapid recovery thereof for conditioning it for primary filter use.

It will be appreciated that the conditions determining reversal of flow may vary with different kinds of sewage or waste material. However, with respect to normal domestic sewage, and merely as an example of one set of conditions which will satisfactorily serve the purpose in carrying out my invention, I find that one may expect a removal of approximately 75 per cent of the B. O. D. in the primary filter. Then, as soon as this percentage of reduction of B. O. D. drops down to 65 or even 70 per cent, the order of filtration may be reversed so that the raw sewage is fed to the previous secondary filter and the previous primary filter is used as the secondary filter, as above described. In other words, and still merely by way of example of one set of conditions which I have found to be satisfactory, when the percentage of reduction of B. O. D. drops 10, or even 5, per cent, a reversal of the order of filtering should be made. It will be understood by those skilled in the art that the character of the sewage or other waste material to be treated may be of such a varied nature that the different percentages of B. O. D. removal may represent similar efficiencies, the extent of removal varying somewhat with the strength and character of the material treated, and it is to be understood that the percentage conditions above set forth may be varied as the character of the waste material requires it. In any event, however, the foregoing example may well serve as a guide, at least comparatively, in determining when any particular overfeeding or overloading condition is being approached, requiring reversal.

Physical overloading of the filter may also serve as a guide respecting reversal. In case the filter becomes physically overloaded, it will pond or plug up to such an extent that the sewage added thereto cannot readily flow through the filter, and ponding will result. If this condition is approached, the order of sewage filtration should be reversed so that the filter which is becoming physically overloaded is given a rest and the secondary filter, which has become upon reversal the primary, carries the load and permits the other filter to restore to a normal primary-functioning condition.

Various structural systems may be employed in practicing my invention, as shown, for example, in the drawings, wherein,—

Figure 1 is a diagrammatic view illustrative of one form of sewage system embodying my invention; and Figs. 2 and 3 are diagrammatic views illustrative of additional forms of systems adapted for practicing my invention.

The structure shown in Fig. 1 includes a supply tank or reservoir 10 which is connected with two separate control tanks (or compartments of a single tank or reservoir) 11 and 12 by a conduit 13 and its branches 14 and 15 having therein, respectively, the valves 16 and 17. The control tanks 11 and 12, preferably but not necessarily, take the form of syphon-controlled dosing tanks adapted to control the flow of sewage material therefrom in a uniform manner to the filtering means, which will now be described.

The filtering means takes the form of trickling filter beds or filters 18 and 19 of similar construction and, preferably, of the character hereinabove first mentioned. The filter 18 is connected with the control tank 11 by a conduit 20, while the filter 19 is connected with the control tank 12 by a conduit 21. These filters are provided with drainage channels 22 and 23 which are connected, respectively, by conduits 24 and 25 to separate pump pits 26 and 27. The pump pits are each of small capacity and are so arranged that the sewage material will not settle therein. If desired, similar pits with suitable flow control mechanism, such as a pump or the like, may be used instead of the control tanks 11 and 12.

The system further includes a pump 28 which is, preferably but not necessarily, of the centrifugal type. This pump is connected with the pump pit 26 by conduits 29 and 30, the latter having a valve 31 therein. The pump 28 is also connected with the pump pit 27 through the conduit 29 and a conduit 32 having a valve 33 therein. In addition to the foregoing, the pump 28 is connected through a conduit 34 and branch conduit 35 to the control tank 11 which leads to the inlet to the filter 18, and through the conduit 34 and a branch conduit 36 to the control tank 12 which is connected with the inlet to the filter 19. The branch conduits 35 and 36 are provided with valves 37 and 38, the purpose of which will be described in detail hereinafter.

Both of the pump pits are connected to a point of disposal which may, if desired, take the form of a tank or reservoir 39. More particularly, the pump pit 26 is connected to the tank 39 through the conduits 40 and 41, the former having a valve 42 therein. The pump pit 27 is connected with the tank 39 by conduits 43 and 41, the former having a valve 44 therein.

In the operation of the foregoing structure in practicing my invention, the direction of flow of the sewage material is determined by the positions of the several valves above described. The valves 16, 31, 38 and 44 may be grouped and referred to as the primary set of valves, while the other valves 17, 37, 32 and 42 may be grouped and designated the secondary set of valves. These valves may take any suitable form adapted to be opened and closed. In the operation of this structure, assuming that the filter 18 is to be operated as the primary filter, the primary set of valves is opened and the secondary set is closed. In that case, sewage material from the supply 10 is flowed through the conduits 13 and 14 past the valve 16 into the control tank 11, from which it is delivered through the conduit 20 to the filter 18. This particular flow is further illustrated by the use of full-line arrows. The sewage material delivered to the filter 18 passes out through the discharge channel 22 into the conduit 24 and thence to the pump pit 26 from which it is drawn through the conduit 30 past the valve 31 and through the conduit 29 to the pump 28. The pump 28 discharges this material through the conduits 34 and 36 past the valve 38 into the control tank 12 from which the material is delivered through the conduit 21 into the filter 19. The material delivered to the filter 19 discharges through the drainage channel 23 into the conduit 25 to the pump pit 27 from which it is delivered into the conduit 43 past the valve 44 into conduit 41 and to the point of disposal 39. In the use of this structure, the sewage material is treated primarily and secondarily in the manner already described. When the filter 18 approaches or reaches a condition wherein its organisms are overfed, as indicated by a drop in percentage of B. O. D. removal, or any other factors determinable of this condition, the primary set of valves is closed and the secondary set is opened, whereupon raw or unfiltered sewage material from the supply 10 will flow first to the filter 19 (which then provides the primary function) and thence to the filter 18, which then provides the secondary function. More particularly, upon such reversal of flow by the reversing of the positions of the two sets of valves, the supply or raw sewage is fed through the conduits 13 and 15, past the valve 17 into the control tank 12 from which it is delivered, under controlled flow conditions, through the conduit 21 to the filter 19. This direction of flow, or the reversal flow, is indicated by the dotted arrows shown on the drawings. The material fed to the filter 19, after treatment therein, is discharged through the channel 23 and conduit 25 into the pump pit 27 from which it is fed through conduit 32 past valve 33 and through conduit 29 to the pump 28. The pump 28 delivers the material through the conduits 34 and 35 past the valve 37 into the tank 11 from which it is delivered, in a controlled manner, through the conduit 20 to the filter 18. After treatment in the filter 18, the material flows out through the channel 22 and conduit 24 into the pump pit 26 from which it is delivered to the point of disposal 39 through the conduit 40 past valve 42 and through conduit 41. When the filter 19, which has just been acting as the primary, reaches a condition wherein reversal is again required, this is accomplished by reversing the opening and closing of the primary and secondary sets of valves, and this operation is carried on continuously, cycle after cycle, indefinitely, by merely reversing the condition of the different sets of valves.

In Fig. 2, I have shown another structural system which is well adapted for use in practicing my invention. This system is similar to that previously described except that control tanks corresponding to the control tanks 11 and 12 (Fig. 1) and pump pits corresponding to the pump pits 26 and 27 (Fig. 1) are omitted so that the flow of the sewage material is controlled solely by a pumping and valving arrangement.

Specifically, this system (Fig. 2) includes a supply reservoir 50 of any suitable form having associated therewith any suitable and well-known means for continuously delivering a uniform controlled flow of material therefrom. The system further includes two filter structures 51 and 52 which may be identical with the filters 18 and 19, previously described. The filter 51 is connected with the supply 50 through a conduit 53 and conduit 54 having a valve 55 therein. The filter 52 is connected with the supply 50 through the conduit 53 and conduit 56 having a valve 57 therein. The outlets from both of the filters 51, 52 are connected to a pump 58, preferably of the centrifugal type, the filter 51 being connected through a conduit 59 having a valve 60 therein and the filter 52 being connected through a conduit 61 having a valve 62 therein. The pump 58 is also connected with the inlet to filter 51 through a conduit 63 and a branch conduit 64 having a valve 65 therein, the latter conduit being connected with the conduit 54 between the valve 55 and the filter 51. The conduit 63 is also connected to the inlet of the filter 52 by a branch conduit 66 having a valve 67 therein, the conduit 66 being connected to the conduit 56 between the valve 57 therein and the filter 52.

The system just described further includes a disposal tank 68 which may take the form of a clarifier or settling tank. This tank is connected to the conduits 59 and 61 between the filters 51 and 52 and the pump 58. Specifically, the conduit 59 (and filter 51) is connected with the clarifier 68 by a branch conduit 69 having a valve 70 therein and the conduit 71. The conduit 61

(and filter 52) is connected to the clarifier 68 by a branch conduit 72 having a valve 73 therein, and the conduit 71.

To facilitate explanation of the operation of this system, the valves 55, 60, 67, and 73 will be referred to as the primary set of valves, and the other valves 57, 62, 65 and 70 will be referred to as the secondary set of valves. When it is desired to operate the filter 51 as the primary and the filter 52 as the secondary, the primary set of valves is opened and the secondary set is closed. In that case, the raw or unfiltered sewage material is flowed under control, as by pump (not shown) or any other suitable and well-known means, through the conduit 53, into the conduit 54, past the valve 55 into the filter 51. In passing through the filter 51, the material is biologically and mechanically treated as already explained in connection with the previous form and from this filter it flows through the conduit 59 past the valve 60 to the pump 58, which delivers it through the conduit 63 into the conduit 66 past the valve 67 into the conduit 56 leading to the filter 52. This particular direction of flow may be readily followed by referring to the full-line arrows shown in Fig. 2. From the filter 52 the material is fed into the conduit 61 and thence into the conduit 72, past the valve 73 into the conduit 71 and to the final disposal tank or reservoir 68. When it is desired to reverse the flow, the primary set of valves is closed and the secondary set opened and, in that case, the material flows from the source 50 into the conduits 53 and 56 past the valve 57 into the filter 52. This reversed flow may be followed by referring to the dotted arrows appearing in Fig. 2. From the filter 52 the material flows into the conduit 61, past the valve 62 to the pump 58, thence through the conduit 63 into the conduit 64 past the valve 65 into the conduit 54 and to the filter 51. From the filter 51 the material flows into the conduits 59 and 69, past the valve 70 into the conduit 71 and to the point of disposal 68. The results obtained in the operation just described are similar to those obtained in the use of the structure of Fig. 1, as more particularly set forth in the general description of the method involved.

The system illustrated in Fig. 3 is the same as the system of Fig. 2, except that settling tanks 80 and 81 are interposed between the filters 82 and 83 and the pump 84. Also, in this case, and in view of the use of the settling tanks 80, 81, the effluent discharging through the conduit 85 is in a condition for final disposal without further settling or separation action. Other than just described, the system of Fig. 3 operates the same as that of Fig. 2 and the operation thereof may readily be understood by following the full-line arrows in case the filter 82 is operated as a primary filter, and by following the dotted-line arrows in the event of reversal and when the filter 83 is operated as the primary filter. Also, in this case, to facilitate understanding of operation, the valves 86, 87, 88 and 89 may be referred to as the primary set of valves, while the valves 90, 91, 92 and 93 may be referred to as the secondary set of valves.

It is believed that the operation and advantages of my invention will be readily understood from the foregoing. With the arrangement and manner of operation described, filtering treatment may be carried on continuously and with substantially maximum efficiency while operating at or near the maximum capacity of the filtering structure used. Shutdown of the system is not required in order to rest the filter structure, the resting being accomplished by reversal of flow whereby the filter needing rest is given less work to do, biologically speaking, thereby resting the same during continued operation thereof. The acting primary filter carries the major load and serves to remove the larger percentage of the organic material from the sewage, while the acting secondary filter carries a reduced load under conditions set up by the primary filter. This, in addition to the advantages already stated, provides for the removal of the more difficult organic or dissolved material left in the effluent from the primary filter. In the actual practice of my invention, the capacity of the customary filter structure may be increased many times, and I believe that, with proper control of reversal periods, the capacity may be extended to as much as thirty or more million gallons of sewage per acre per day, or over 5000 pounds of B. O. D. per acre-foot per day, while maintaining the desired efficiency with respect to B. O. D. removal or otherwise. This, obviously, is of great importance from the standpoint of economy. Construction cost is materially reduced; much space, which is often quite expensive, is conserved. Also, the continuous dosing of the filter beds to the maximum or near-maximum condition maintains such wetness in the bed or such a flow condition as to prevent the nuisance caused by the Psychoda fly by destruction of the larvae thereof, or the prevention of the depositing of the larvae in the gelatinous sewage bed film, or otherwise.

It will be understood that while I have shown only three systems for carrying out my invention, other arrangements may be resorted to without departing from the spirit and scope of my invention as defined by the claims that follow.

I claim:

1. The method of treating sewage or other waste material by subjecting it to a trickling filter action for purposes of final disposal, which comprises the steps of feeding the raw or unfiltered material to and through a primary zone in which it is subjected to the biological and mechanical actions of a trickling filter, feeding the effluent from said primary zone to and through a secondary zone where it is resubjected to a similar trickling filter action, reversing the direction of flow of the material from zone to zone at predetermined times so that said primary and secondary zones serve alternately as secondary and primary zones, respectively, and feeding the effluent from the existing secondary zone to a point of disposal.

2. The method of treating sewage or other waste material for purposes of final disposal, which comprises the steps of feeding raw or unfiltered material to and through a primary zone in which it is subjected to the biological and mechanical actions of a trickling filter, feeding the effluent from said primary zone to a settling zone, feeding the effluent from said settling zone to and through a secondary zone in which it is subjected to the biological and mechanical actions of a trickling filter, feeding the effluent from said secondary zone to a second settling zone, reversing the direction of flow of the raw or unfiltered material so that it is fed first to said secondary zone, then to said second settling zone, then to said primary zone and then to said first settling zone, and delivering the effluent from either said first or second settling zone, depending upon the direction of flow, to a point of disposal.

3. The method of treating sewage or other waste material for purposes of final disposal, which comprises the steps of feeding raw or unfiltered material to and through a primary zone in which it is subjected to the biological and mechanical actions of a trickling filter, feeding the effluent from said primary zone to and through a secondary zone in which it is further subjected to a trickling filter action, reversing the flow of the material so that it is fed first to said secondary zone and the effluent from said secondary zone is fed to said primary zone, subjecting the effluent from that zone which is active as a primary zone to a settling action before it is fed to the zone which is acting as a secondary zone, and feeding the final effluent to a point of disposal.

4. In a system for treating sewage or other waste material by subjecting it to a trickling filter action which includes in combination a supply means, a trickling filter bed wherein the material is subjected to biological and mechanical filter actions, a second filter bed similar to said first filter bed, means for feeding raw or unfiltered material to said first filter bed, a second means for feeding the effluent from said first filter bed to said second filter bed, flow control means between said supply means and both of said filter beds and between said filter beds and said second means, said flow control means being adjustable to reverse the flow of the material so that it is directed first to said second filter bed, thence to said first filter bed, or vice versa, under the control of both said feeding means, and additional flow control means adjustable to direct the effluent from either of said filter beds to a point of disposal.

5. In a system for treating sewage or other waste material by subjecting it to a trickling filter action which includes in combination a supply means, a filter bed adapted to subject the material to both biological and mechanical actions of a trickling filter, a second filter bed similar to said first filter bed, conduit means leading from said supply means and having branch connections, one leading to said first filter bed and the other to said second filter bed, a valve in each of said branches, feeding means having a conduit leading therefrom and having a branch conduit leading to the discharge end of said first bed and another branch leading to the discharge end of said second filter bed, another conduit leading from said feeding means and having one branch connecting with the inlet to said first filter bed and another branch connecting with the inlet to said second filter bed, each of said branches having a valve therein, conduit means having a valve therein connecting the outlet of said first filter to a point of disposal and conduit means having a valve therein connecting the outlet of said second filter to said point of disposal, all said valves being adapted to be opened and closed and so arranged that when certain thereof are in open position and the others are closed the flow of raw or unfiltered material is directed to said first filter bed, then to said feeding means, then to said second filter bed and then to said point of disposal, and when said certain valves are closed and said other valves are open the flow of raw or unfiltered material is directed first to said second filter bed, then to said feeding means, then to said first filter bed and then to said point of disposal.

6. In a system for treating sewage or other waste material for disposal purposes, which includes in combination, a supply means, a pair of filter beds adapted to subject the material to both biological and mechanical actions of a trickling filter, said filter beds having their inlets connected to said supply means, a separate settling reservoir connected to the outlet of each of said filter beds, pump means connected to the outlets of said settling reservoirs and also connected to the inlets to said filter beds, the connections between the foregoing elements being such that the direction of flow of the material is from said supply means to one of said filter beds to one of said settling tanks to said pump means to the other of said filter beds to the other of said settling reservoirs, valve means between the elements named adapted to be opened and closed to accomplish the flow of said material in reversed directions, and means for discharging the material from the settling tank through which it last passes to a point of discharge.

LAWRENCE E. LANGDON.